United States Patent
Korechika et al.

(10) Patent No.: US 6,935,456 B2
(45) Date of Patent: Aug. 30, 2005

(54) AUTOMOTIVE SEAT SAFETY MECHANISM

(75) Inventors: Koji Korechika, 24-1, Itsutsugaoka 1-chome, Toyota-shi, Aichi-ken, 471-0814 (JP); Noriko Korechika, 24-1, Itsutsugaoka 1-chome, Toyota-shi, Aichi-ken, 471-0814 (JP)

(73) Assignees: Koji Korechika, Aichi-ken (JP); Noriko Korechika, Aichi-ken (JP); Sayoko Korechika, Aichi-ken (JP); Yusuke Korechika, Aichi-ken (JP)

( * ) Notice: Subject to any disclaimer, the term of this patent is extended or adjusted under 35 U.S.C. 154(b) by 173 days.

(21) Appl. No.: 10/338,058

(22) Filed: Jan. 6, 2003

(65) Prior Publication Data

US 2003/0136598 A1 Jul. 24, 2003

(30) Foreign Application Priority Data

Jan. 21, 2002  (JP) ........................................ 2002-011375

(51) Int. Cl.⁷ ............................ B60R 21/00; B60N 2/02
(52) U.S. Cl. ........................................ 180/268; 296/68.1
(58) Field of Search ................................ 180/268, 271; 280/806, 808; 296/68.1, 65.02; 297/216.1, 216.12, 216.13, 216.14

(56) References Cited

U.S. PATENT DOCUMENTS 3,922,029 A * 11/1975 Urai ........................ 296/68.1
4,285,545 A * 8/1981 Protze ...................... 297/483
5,533,775 A * 7/1996 Cyliax ...................... 296/68.1
5,810,417 A * 9/1998 Jesadanont ................ 296/68.1

FOREIGN PATENT DOCUMENTS

JP          2001213211 A       8/2001

* cited by examiner

Primary Examiner—David R. Dunn
(74) Attorney, Agent, or Firm—Beyer, Weaver & Thomas, LLP (57) ABSTRACT

An automotive seat safety mechanism includes a seat back and a webbing arranged between the seat back and a vehicle roof. A retractor urges the webbing in a winding direction while simultaneously permitting the webbing to be drawn out in an unwinding direction when in a normal state and prevents the webbing from being drawn out when deceleration of the vehicle becomes greater than a predetermined value. A bypassing mechanism is arranged above the seat back. A pretensioner is included in the retractor. The retractor is arranged above and rearward from the seat back. The webbing extends between an upper position of the seat back and the retractor bypassing the bypassing mechanism. The webbing is disengaged from the bypassing mechanism when forward deceleration becomes greater than a predetermined value. The pretensioner is activated to quickly draw in the webbing in response to the forward deceleration.

19 Claims, 11 Drawing Sheets

AUTOMOTIVE SEAT SAFETY MECHANISM

BACKGROUND OF THE INVENTION

The present invention relates to an automotive seat safety mechanism that is installed in an automotive seat and functions when a collision occurs.

In the prior art, in addition to the employment of a three-point safety belt, which restrains a passenger to an automotive seat, mechanisms for increasing the strength of the seat itself has been proposed to resist impacts. For example, Japanese Laid-Open Patent Publication No. 2001-213211 describes a mechanism in which a webbing is arranged between a seat back and the roof of a vehicle. When an impact load is applied to the seat back, the webbing, which is drawn into a retractor, is locked. This securely supports the head rest and protects the head of the passenger.

In such case, the webbing functions as a reinforcing member and supports the seat back from the roof. However, such webbing has a shortcoming in that it reduces the interior space in the rear of the vehicle and interferes a passenger who gets into or out of the rear of the vehicle. Accordingly, it is preferable that the webbing be extended vertically upward from the seat back, as described in Japanese Laid-Open Patent Publication No. 2001-213211, so that the webbing does not extend in a rearward direction from the seat back.

However, since the seat back is normally inclined toward the rear when a passenger is sitting on the seat, the webbing described in the publication may not be able to efficiently support the seat back when an impact is applied to the seat back.

Figure 18:
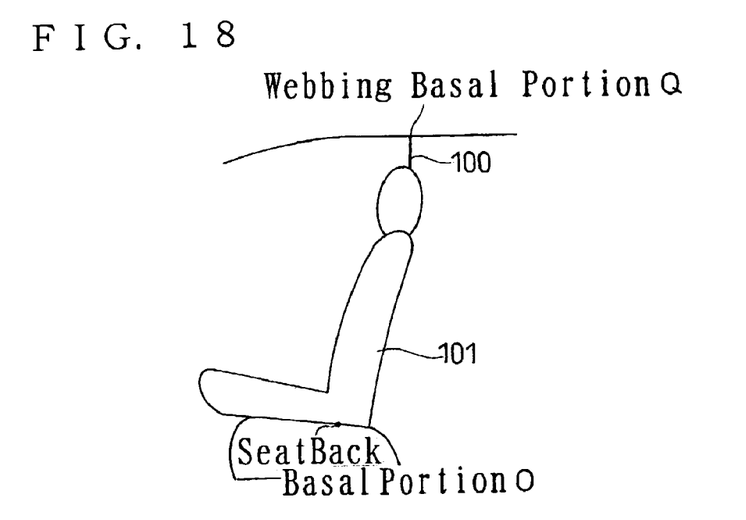
FIG. 18 is a schematic side view showing a prior art seat back.
Figure 19:
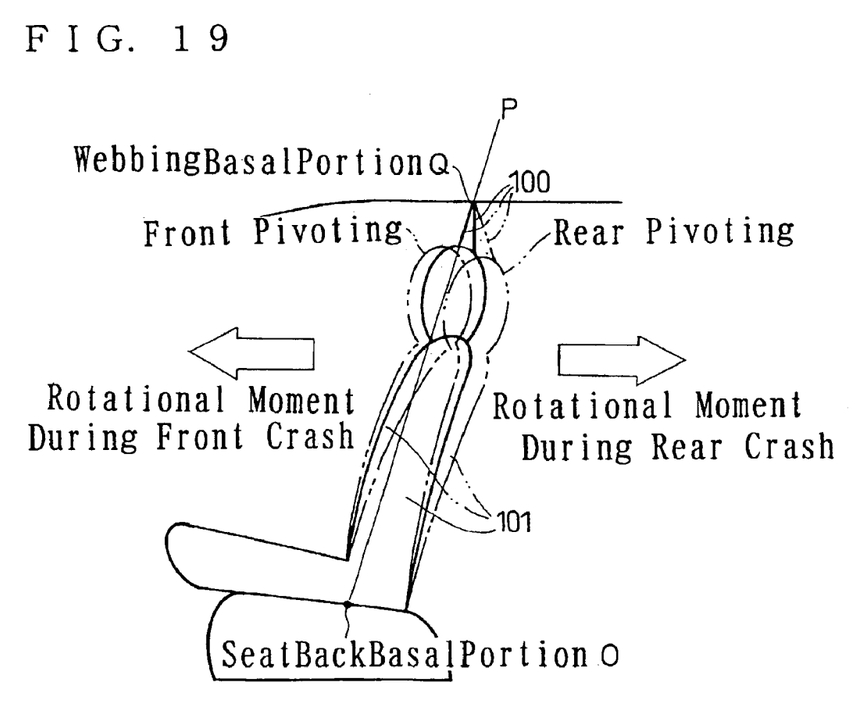
FIG. 19 is a schematic side view illustrating rotational moment that is applied to the prior art seat back during a collision.

Referring to FIGS. 18 and 19, a webbing 100 functions to reinforce an automotive seat 101. When an impact is applied to the rear of the vehicle (hereinafter, referred to as rear crash), a rotational moment acting to pivot the seat back 101 toward the rear (rearward pivoting) about basal portion O is applied to the seat back 101. In such case, the rotational moment locks the webbing 100. Thus, the locked webbing 100 supports the seat back 101 when the seat back 101 starts rearward pivoting. In other words, the webbing 100 directly counters the rotational moment, which is produced by the impact.

When an impact is applied to the front of the vehicle (hereinafter, referred to as front crash), a rotational moment acting to pivot the seat back 101 toward the front (forward pivoting) about basal portion O is applied to the seat back 101. However, unlike during a rear crash, the forward pivoting of the seat back 101 first loosens the webbing 100. Thus, the webbing 100 is not immediately locked. Theoretically, the webbing 100 is not locked until a force that pulls the webbing 100 is produced when the seat back 101 exceeds line P, which connects the basal portion Q of the webbing 100 and the pivoting center of the seat back 101, as shown in FIG. 19.

Therefore, during a front crash, the webbing 100 may not sufficiently absorb the impact and restrain the seat back 101.

Further, the impact load applied to the seat back 101 may be stronger during a front crash than during a rear crash. For example, a passenger sitting in the rear seat may be thrown against the seat back 101 during a front crash. Additionally, when a rear passenger air bag is installed in the seat back 101, the impact (reaction) resulting from the activation of the air bag may produce a rotational moment that results in forward pivoting of the seat back 101.

Accordingly, there is a demand for a mechanism that functions to sufficiently support a seat back during a front crash.

SUMMARY OF THE INVENTION

It is an object of the present invention to provide an automotive seat safety mechanism that reinforces an automotive seat with a belt during a collision, especially during a front crash.

The present invention provides an automotive seat safety mechanism including an automotive seat having a scat cushion and a seat back, which is arranged on a rear portion of the seat cushion, and a webbing arranged between the seat back and an upper portion of a vehicle. A retractor urges the webbing in a winding direction to draw in the webbing while strenuously permitting the webbing to be drawn out of the refractor in an unwinding direction when in a normal state and prevents the webbing from being drawn out when deceleration of the vehicle becomes greater than or equal to a predetermined value. The automotive seat safety mechanism includes a bypassing mechanism arranged above the seat back. A pretensioner is included in the retractor. The refractor is arranged rearward from the seat back in the upper portion of the vehicle. The webbing has an end secured to an upper position of the seat back and is extended through the bypassing mechanism to the retractor. The webbing is disengaged from the bypassing mechanism when forward deceleration of the vehicle becomes greater than or equal to a predetermined value. The pretensioner of the retractor is activated to quickly draw in the webbing in the winding direction in response to the forward deceleration.

A further aspect of the present invention is an automotive seat safety mechanism including an automotive seat having a seat cushion and a seat back, which is arranged on a rear portion of the seat cushion, and a webbing arranged between the seat back and an upper portion of a vehicle. A retractor urges the webbing in a winding direction to draw in the webbing while simultaneously permitting the webbing to be drawn out of the retractor in an unwinding direction when in a normal state and prevents the webbing from being drawn out when deceleration of the vehicle becomes greater than or equal to a predetermined value. The automotive seat safety mechanism includes a bypassing mechanism arranged above the seat back. A pretensioner is included in the retractor. The retractor is arranged in an upper portion of the seat back. The webbing has an end secured to the upper portion rearward from the seat back and is extended through the bypassing mechanism to the retractor. The webbing is disengaged from the bypassing mechanism when forward deceleration of the vehicle becomes greater than or equal to a predetermined value. The pretensioner of the retractor is activated to quickly draw in the webbing in response to the forward deceleration.

A further aspect of the present invention is an automotive seat safety mechanism including an automotive seat having a seat cushion and a seat back, which is arranged on a rear portion of the seat cushion, a child seat detachably installed on the automotive seat, and a webbing arranged between the seat back and an upper portion of a vehicle. A retractor urges the webbing in a winding direction to draw in the webbing while simultaneously permitting the webbing to be drawn out of the retractor in an unwinding direction when in a normal state and prevents the webbing from being drawn out when deceleration of the vehicle becomes greater than or equal to a predetermined value. The automotive seat safety mechanism includes a bypassing mechanism arranged above the seat back. A pretensioner is included in the retractor. The retractor is arranged rearward from the seat back in the upper portion of the vehicle. The webbing has an end secured to an upper position of the seal back and is extended through the bypassing mechanism to the retractor. The webbing is disengaged from the bypassing mechanism when forward deceleration of the vehicle becomes greater than or equal to a predetermined value. The pretensioner of the retractor is activated to quickly draw in the webbing in the winding direction in response to the forward deceleration. The child seat is fixed to the upper position of the seat back by a fastening belt. The fastening belt includes a load limiter.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A preferred embodiment of the present invention will now be discussed with reference to the drawings.

Figure 8:
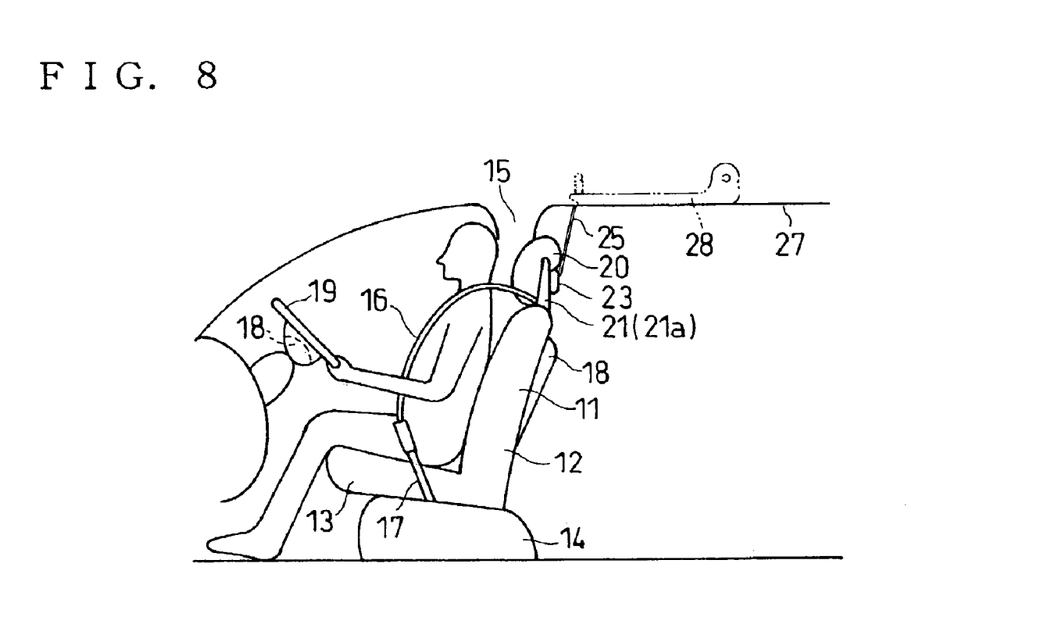
FIG. 8 is a schematic side view showing the state of a passenger compartment during normal driving.
Figure 9:
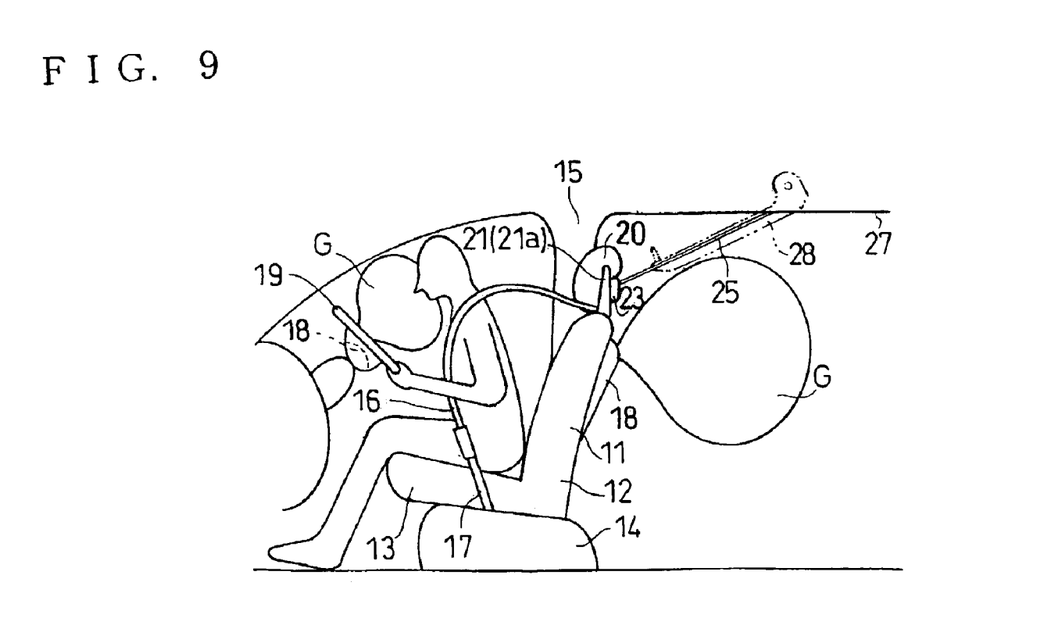
FIG. 9 is a schematic side view showing the state of the passenger compartment during a front crash.
Figure 10:
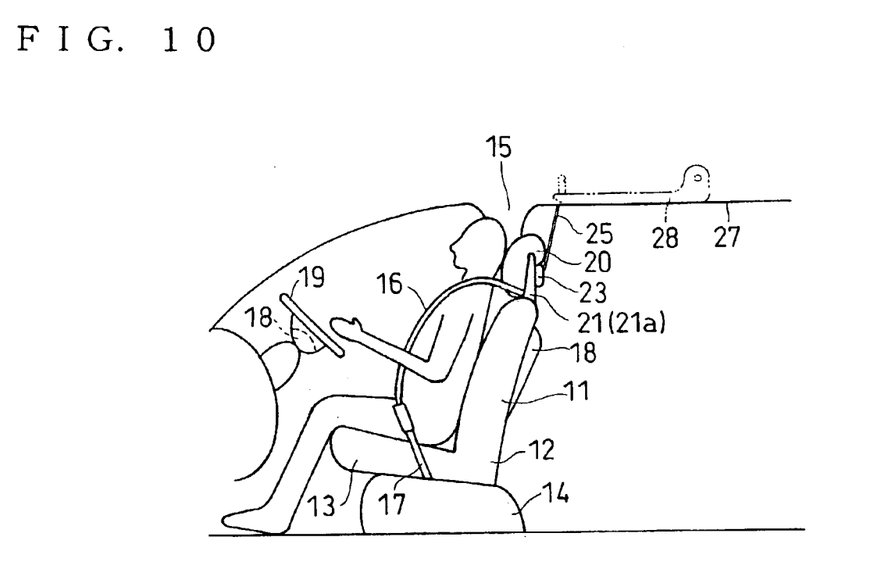
FIG. 10 is a schematic side view showing the state of the passenger compartment during a rear crash.

The structure of a passenger compartment related with the present invention will first be discussed. Referring to FIGS. 8 to 10, a front seat 11 includes a seat back 12 and a seat cushion 13. The seat cushion 13 is fixed on a base 14. A reclining mechanism (not shown) enables the seat back 12 to be reclined. Further, a slide mechanism (not shown) enables the seat 11 to move forward and rearward relative to the base 14.

A three-point belt 16 is attached to the seat 11. The belt 16 is fastened to a holder 17, which is attached to the base 14. In the preferred embodiment, an air bag 18 is installed in the rear of the seat back 12. A further air bag 18 is installed in a steering wheel 19.

A head rest 20 is arranged above the seat back 12. In the preferred embodiment, the head rest 20 is fixed to a projecting portion 21a of a support frame 21, which is the frame of the seat back 12.

Figure 1:
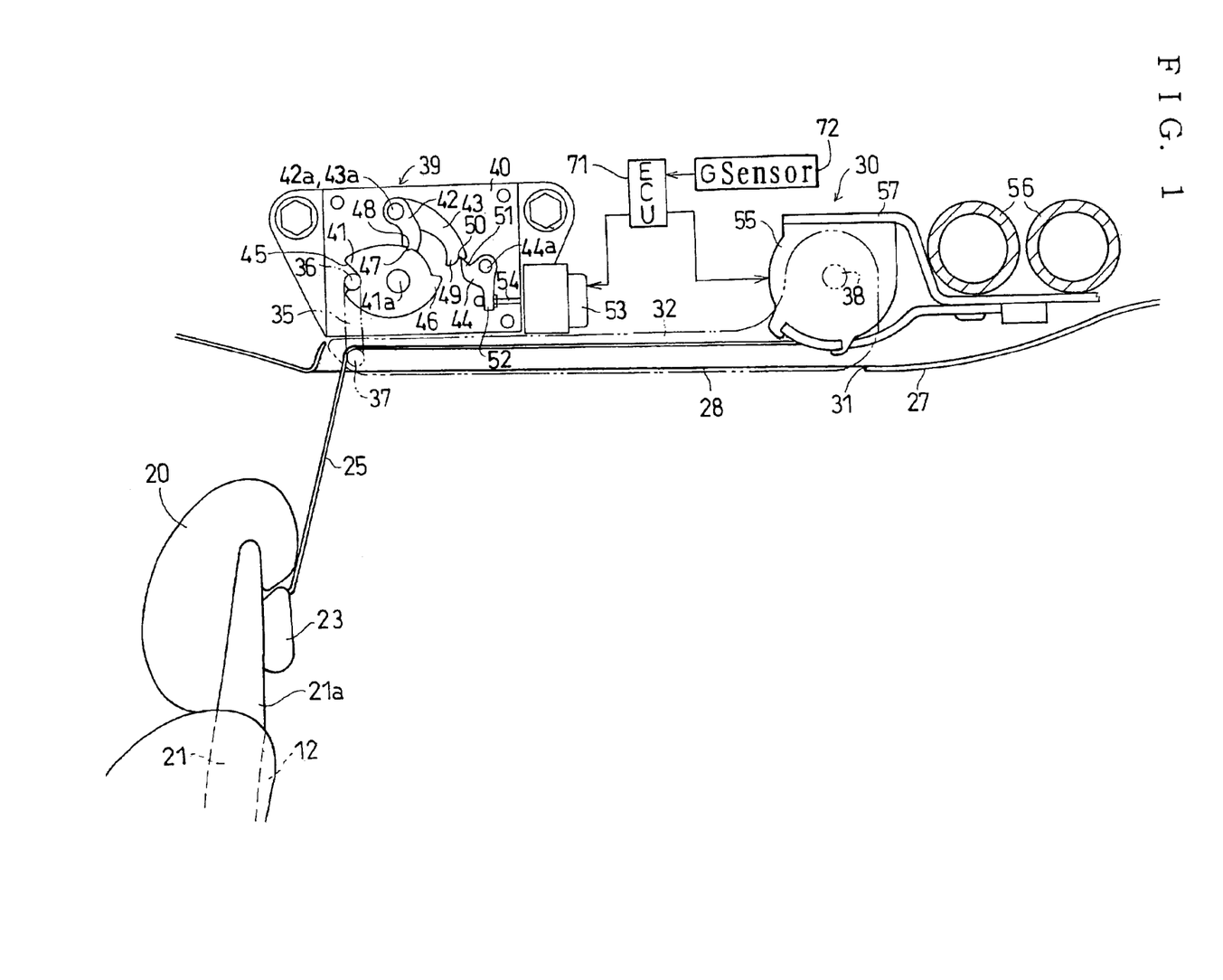
FIG. 1 is a schematic side view showing an automotive seat safety mechanism according to a preferred embodiment of the present invention.
Figure 2:
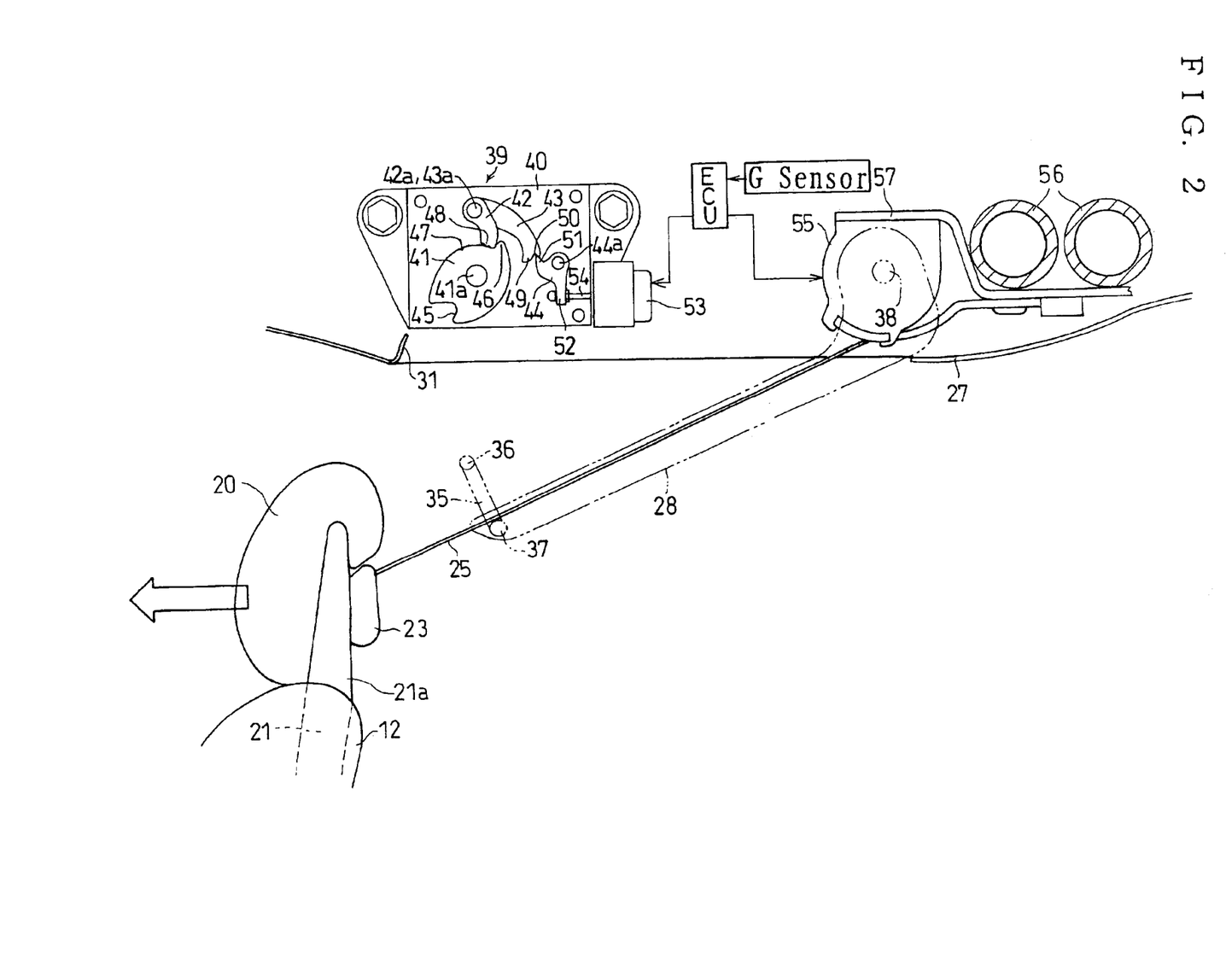
FIG. 2 is a schematic side view showing the automotive seat safety mechanism in an activated state.

The distal end of a webbing 25 is connected to the projecting portion 21a by means of a holder 23. The basal portion of the webbing 25 extends upward and leads into a roof 27 of the vehicle. A guide hanger 28, which serves as a guide, is arranged in the roof 27. As shown in FIGS. 1 and 2, a belt winding unit 30 is arranged above the guide hanger 28 (in the roof 27). The guide hanger 28 and the belt winding unit 30 will now be discussed in detail.

Figure 6:
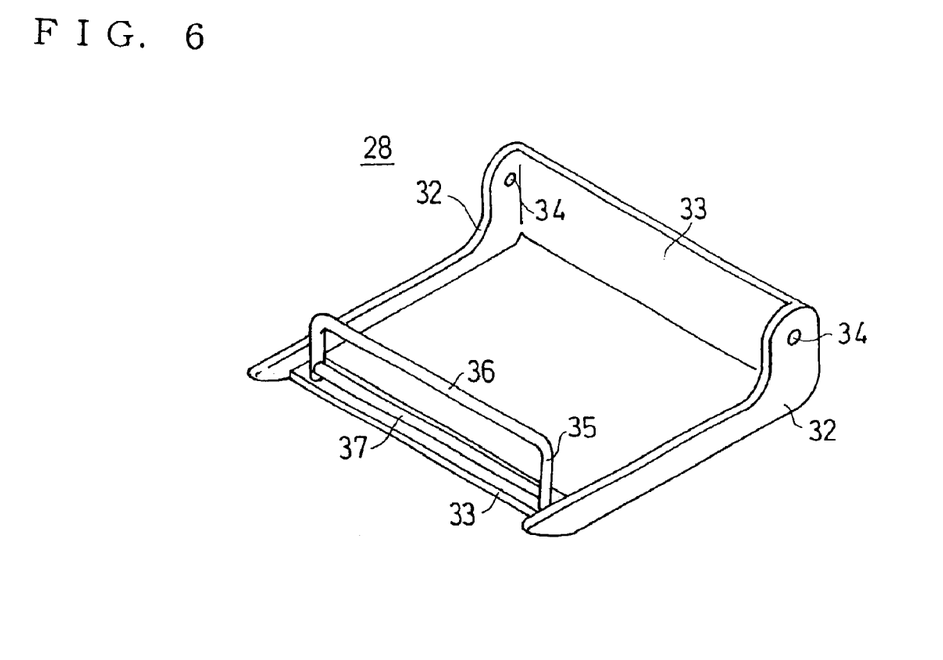
FIG. 6 is a perspective view showing a guide hanger.

Referring to FIGS. 1 and 2, the roof 27 has an opening 31. The opening 31 extends rearward from a position corresponding to the normal position of the seat back 12. The guide hanger 28 is arranged at a position corresponding to the opening 31. Referring to FIG. 6, the guide hanger 28 includes left and right hockey stick-like base frames 32 and front and rear connecting frames 33, which connect the base frames 32. Thus, the guide hanger 28 defines a rather flat square frame.

An engaging frame 35 is arranged on the front connecting frame 33. Upper and lower engaging bars 36, 37 extend parallel to each other in the horizontal direction in the engaging frame 35. The lower engaging bar 37, which engages the webbing 25, functions to change the direction of the webbing 25 when the webbing 25 is extended in a bypassed manner by the guide hanger 28. The surface of the lower engaging bar 37 is curved to define a guide surface that smoothly guides the webbing 25.

Bearings 34 are formed in the rearward portion of the base frame 32. A support shaft 38 is received in the bearings 34 to support the guide hanger 28 in a cantilevered manner. The guide hanger 28 pivots about the support shaft 38 between a normal position, in which the guide hanger 28 closes the opening 31, and a drop position, in which the guide hanger 28 is dropped from the normal position.

The belt winding unit 30 includes a lock mechanism 39, which is located in the front portion of the belt winding unit 30, and a retractor 55, which is located in the rear portion of the belt winding unit 30. The lock mechanism 39 will now be discussed.

The lock mechanism 39, which functions as a bypassing mechanism, includes a cam mechanism having a cam 41, a first lever 42, a second lever 43, and a ratchet lever 44. The cam 41 is generally oval and rotates about a rotational shaft 41a. A first engaging notch 45 is formed in the front portion of the cam 41. An engaging projection 46 projects from the cam 41 on the substantially opposite side of the first engaging notch 45. A second engaging notch 47 is formed at an upper position of the cam 41 between the first engaging notch 45 and the engaging projection 45. The weight distribution of the cam 41 is such that the left side of the rotational shaft 41a (the side of the first engaging notch 45) is heavier than the right side of the rotational shaft 41a (the side of the second engaging notch 46), as viewed in FIG. 3. As a result, when the cam 41 is free in the state of FIG. 3, the cam 41 rotates in a counterclockwise direction.

Figure 3:
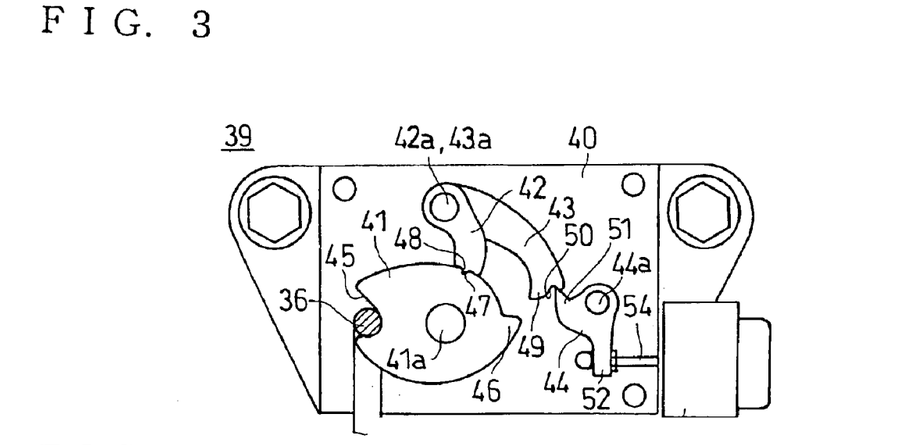
FIG. 3 is a side view showing a lock mechanism in a normal driving state.

The first lever 42 is located above the cam 41. The first lever 42 is supported pivotally about a pivot shaft 42a. An engaging projection 48 projects from the distal end of the first lever 42. The engaging projection 48 engages the second engaging notch 47. The first lever 42 is curved at the vicinity of the engaging projection 48 in correspondence with the curve of the cam 41 in the vicinity of the second engaging notch 47. Thus, the distal portion of the first lever 42 comes into close contact with the peripheral surface of the cam 41 when the engaging projection 48 engages the second engaging notch 47.

Part of the second lever 43 overlaps the first lever 42. The second lever 43 is pivotally supported about a pivot shaft 43a, the axis of which is the same as the pivot shaft 42a of the first lever 42. A spring (not shown) constantly urges the second lever 43 in a clockwise direction about the pivot shaft 43a. The distal end of the second lever 43 defines an engaging end 49, which engages the engaging projection 46. An engaging recess 50 is defined adjacent to the engaging end 49. The ratchet lever 44 is arranged rearward from the cam 41. The ratchet lever 44 is pivotally supported about a pivot shaft 44a. A ratchet 51 projecting forward from the ratchet lever 44 engages the engaging recess 50. An arm 52 extends downward from the ratchet lever 44. The arm 52 is connected to an output shaft 54 of a solenoid 53, which is fixed to a base plate 40.

Figure 4:
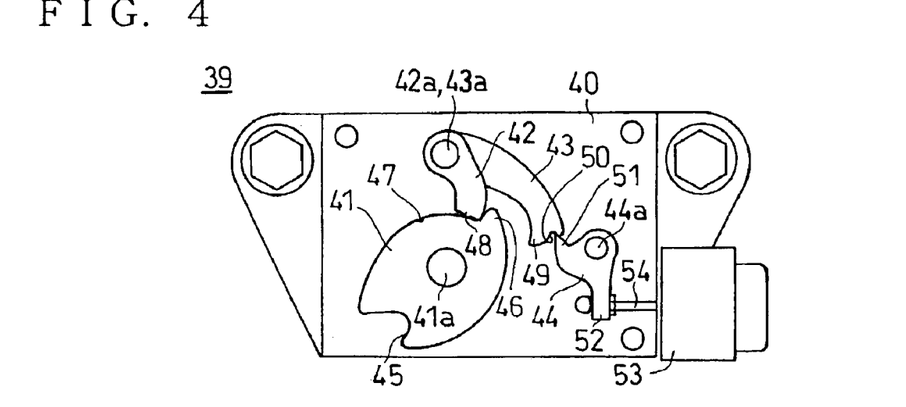
FIG. 4 is a side view showing the lock mechanism in a front crash state.
Figure 5:
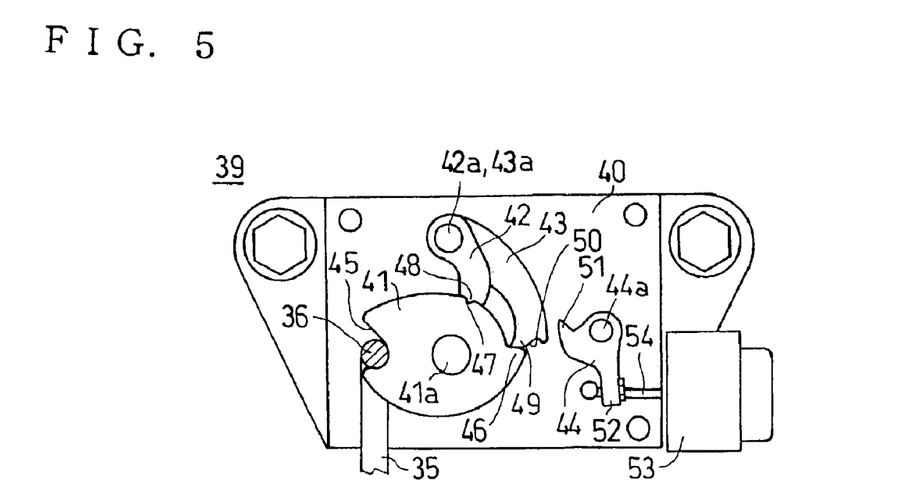
FIG. 5 is a side view showing the lock mechanism in a rear crash state.

The lock mechanism 39 is shown in three states in FIGS. 3 to 5. Normally, as shown in the state of FIG. 3, the pivoting of the cam 41 is restricted due to the engagement between the engaging projection 48 of the first lever 42 and the second engaging notch 47 of the cam 41. Further, the upper engaging bar 36 of the guide hanger 28 is engaged with the first engaging notch 45 of the cam 41. In this state, the guide hanger 28 is arranged in the roof 27 at a normal position. The other two states of the lock mechanism 39 will be discussed later.

Figure 7:
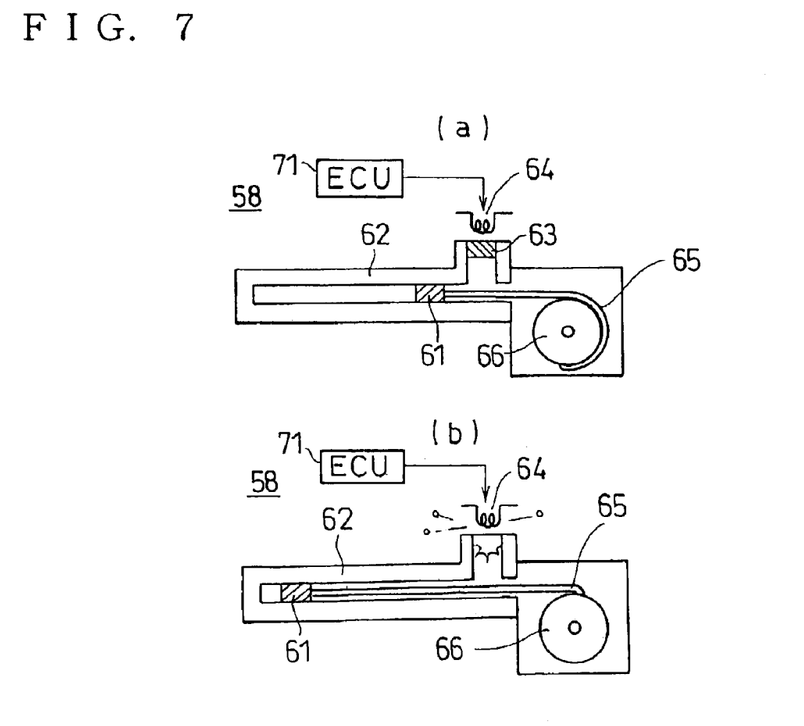
FIG. 7(a) is a schematic view showing a pretensioner in a state prior to activation.
FIG. 7(b) is a schematic view showing the pretensioner in a state subsequent to activation.

The retractor 55 is supported by a holding frame 57, which is secured to a reinforcement pipe frame 56 arranged in the roof 27. A spring (not shown) constantly urges the retractor 55 to wind the webbing 25. The retractor 55 includes a pretensioner 58. Referring to FIGS. 7(a) and 7(b), the pretensioner 58 includes a piston 61, a cylinder 62, a propulsion agent 63, an ignitor 64, a wire 65, and a rotor 66. The ignitor 64 ignites the propulsion agent 63 to generate combustion pressure, which is applied to the piston 61. This pushes the piston 61 and pulls the wire 65. Thus, the wire 65 rotates the rotor 66 and instantaneously draws the webbing 25 into the retractor 55.

Referring to FIGS. 1, 2, 7(a), and 7(b), the solenoid 53 and the pretensioner 58 are connected to and controlled by an electronic control unit (ECU) 71. The ECU 71 includes a central processing unit (CPU), a memory, and an input/output interface (none shown).

The ECU 71 is connected to an acceleration (G) sensor 72. The acceleration sensor 72 sends a detection signal to the ECU 71 when detecting predetermined acceleration or deceleration.

The operation of the preferred embodiment will now be discussed.

As shown in FIG. 8, a driver normally sits on the front seat 11 and fastens the three-point belt 16 to drive the vehicle. The driver adjusts the seat 11, or the position of the seat 11 relative to the base 14, to where the driver feels comfortable driving. The driver also adjusts the seat back 12 to an angle at which the driver feels comfortable. The webbing 25 is drawn out of or drawn into the retractor 55 in accordance with the position and angle of the seat back 12. In this state, the retractor 55 constantly applies a predetermined tension to the webbing 25, which extends toward the roof 27. In the normal driving state, the guide hanger 28 is located at a position where it closes the opening 31, as shown in the state of FIGS. 1 and 8. That is, in the lock mechanism 39, the engaging projection 48 of the first lever 42 is engaged with the second engaging notch 47 of the cam 41, and the upper engaging bar 36 of the guide hanger 28 is engaged with the first engaging notch 45 of the cam 41.

When a front crash occurs and an impact having a predetermined force or greater is applied to the vehicle, the vibration caused by the impact separates (disengages) the engaging projection 48 of the first lever 42 from the second engaging notch 47 of the cam 41. This rotates the cam 41 in the counterclockwise direction (the state of FIG. 4). Simultaneously, the upper engaging bar 36 of the guide hanger 28 is separated (disengaged) from the cam 41. Thus, the guide hanger 28 pivots downward about the bearings 34. In other words, the guide hanger 28 drops into the passenger compartment as shown in the states of FIGS. 2 and 9.

Further, the acceleration sensor 72 detects sudden deceleration and sends a detection signal to the ECU 71. In response to the detection signal, the ECU 71 heats the ignitor 64 of the pretensioner 58. This burns the propulsion agent 63 and generates combustion pressure, which instantaneously draws the webbing 25 into the retractor 55. As a result, as shown in the state of FIG. 2, the webbing 25, which extends straight and directly from the retractor 55, supports the upper portion of the seat back 12. In this state, the tension applied to the webbing 25 is strong. This counters the rotational moment acting to pivot the seat back 12 forward.

The front crash also activates the air bags 18 in response to the detection of acceleration sensors, which are incorporated in the air bags 18, and inflates bags G.

When a rear crash occurs and an impact having a predetermined force or greater is applied to the vehicle, a rotational moment acting to pivot the seat back 12 rearward is produced. The seat back 12 is supported from an upper rearward position when a front crash occurs. However, when a rear crash occurs, it is preferred that the seat back 12 be supported from above. Thus, the lock mechanism 39 remains locked so that the guide hanger 28 is not dropped. That is, the acceleration sensor 72 detects sudden acceleration due to the rear crash and sends a detection signal to the ECU 71. In response to the detection signal, to the ECU 71. In response to the detection signal, the ECU 71 drives the solenoid 53 (i.e., moves the output shaft 54 to the rear) and rotates the ratchet lever 44 in the counterclockwise direction, as viewed in FIG. 3. This separates (disengages) the ratchet 51 from the engaging recess 50, rotates the second lever 43 in the clockwise direction, and engages (locks) the engaging projection 46 of the cam 41 with the second lever 43. As a result, the second lever 43 restricts counterclockwise rotation of the cam 41. Thus, the upper engaging bar 36 of the guide hanger 28 is not separated from the first engaging notch 45 (as shown in the state of FIG. 10). Further, the retractor 55 locks the belt 25. Thus, the seat back 12 counters rotational moment acting to pivot the seat back 12 rearward.

The preferred embodiments has the advantages described below.

(1) During a front crash, the guide hanger 28 is dropped to support the seat back 12 from a direction that is close to the vector component of a reaction direction of the rotational moment applied to the seat back 12. Thus, the seat back 12 resists a strong rotational moment. Further, during a rear crash, the guide hanger 28 is not dropped and the webbing 25 is locked in a state extended in an upward direction. Thus, the seat back 12 is supported in an optimal manner during both front and rear crashes.

(2) The dropping of the guide hanger 28 would momentarily loosen the tension applied to the webbing 25. However, the webbing 25 is drawn into the retractor 55 simultaneously with the front crash. Thus, the seat back 12 is supported without any time lag.

(3) When a rear crash occurs, the cam 41 is locked so that it does not rotate. This guarantees that the guide hanger 28 will not be dropped.

(4) The seat back 12 of the seat 11 is supported by the webbing 25 during a collision. Thus, the seat 11 resists strong rotational moments during a collision. As a result, the three-point belt 16 may be employed for the seat 11 without a special reinforcement structure.

It should be apparent to those skilled in the art that the present invention may be embodied in many other specific forms without departing from the spirit or scope of the invention. Particularly, it should be understood that the present invention may be embodied in the following forms.

The present invention is applied to the driver's seat in the preferred embodiment. However, the present invention may also be applied to a passenger seat. Additionally, the present invention may also be applied to a seat included in a seat row other than the front row in a vehicle having three or more seat rows.

Figure 13:
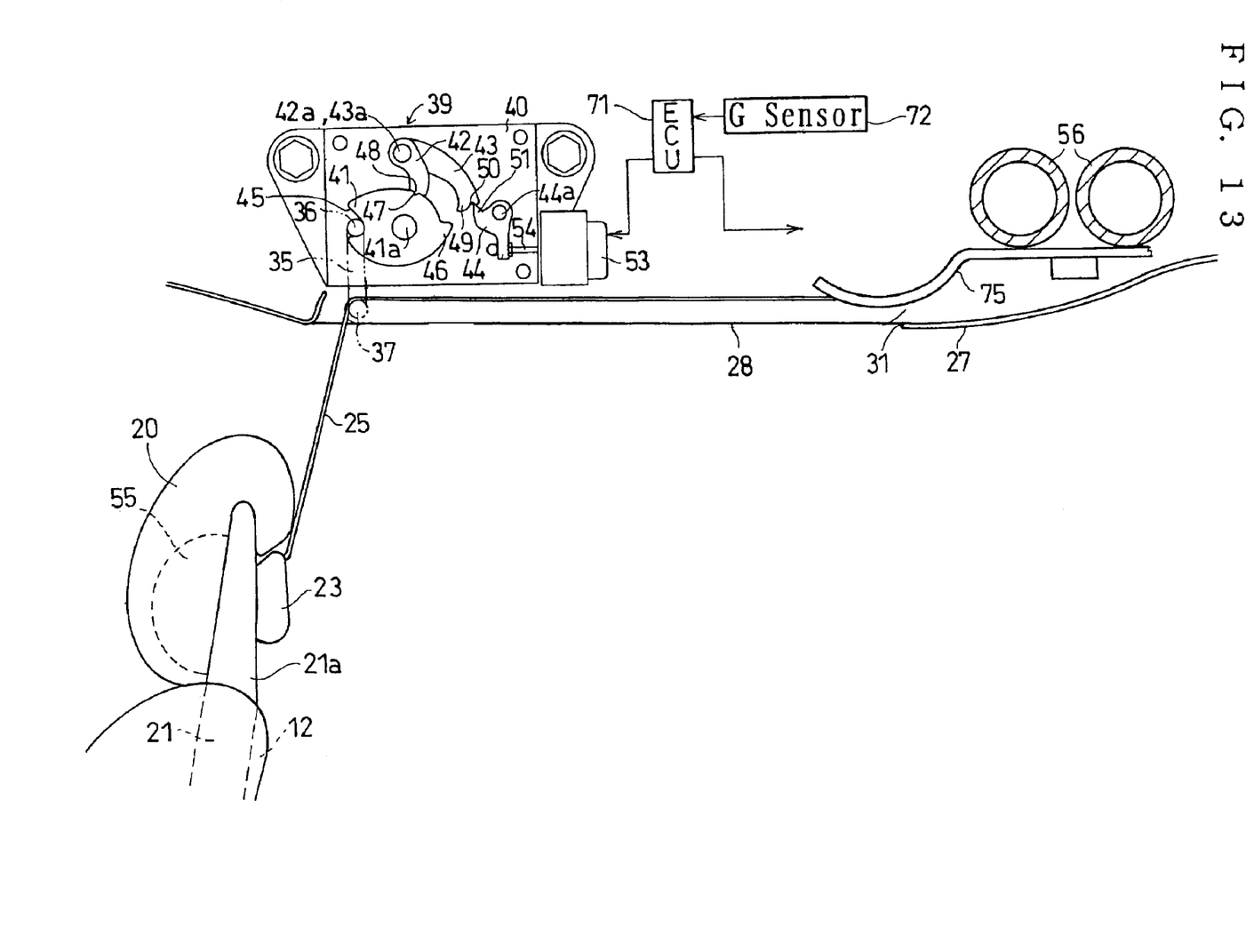
FIG. 13 is a schematic side view showing an automotive seat safety mechanism according to a further embodiment of the present invention.

As shown in FIG. 13, the retractor 55 may be fixed to the support frame 21 and accommodated in the head rest 20. In this case, the distal end of the webbing 25 is connected to a holding frame 75, which is attached to the reinforcement pipe frame 56 in the roof 27.

Figure 14:
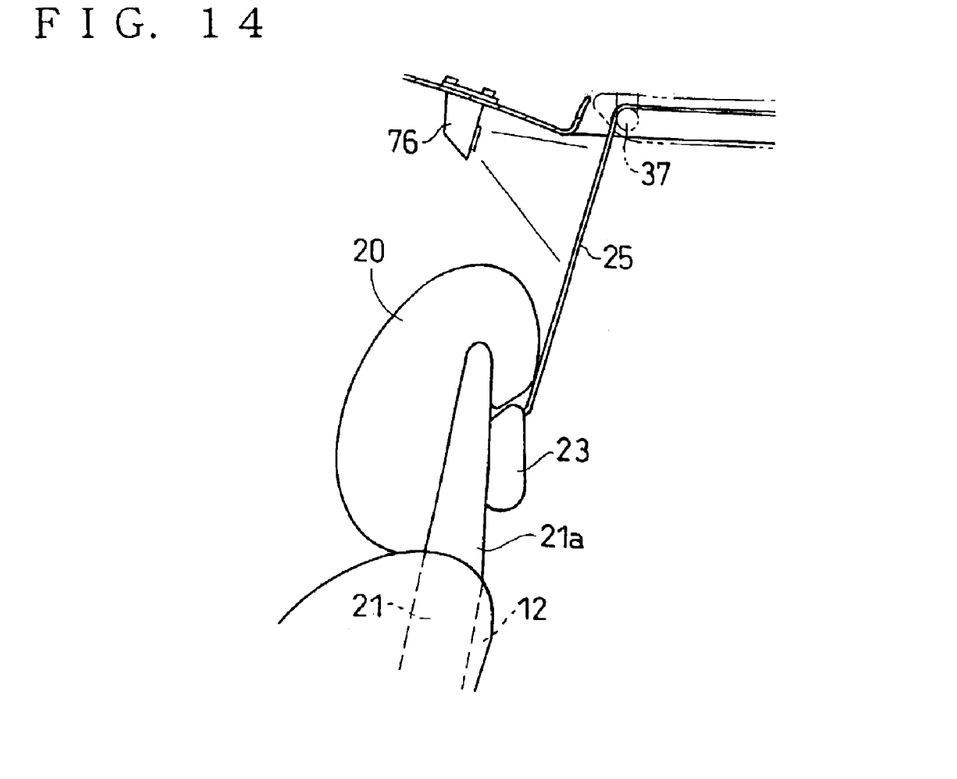
FIG. 14 is a schematic side view showing a webbing in a state in which the belt is used as a screen.

As shown in FIG. 14, a projector 76 may be arranged above the seat 11. The projector 76 uses the webbing 25 as a screen to project an image.

Figure 15:
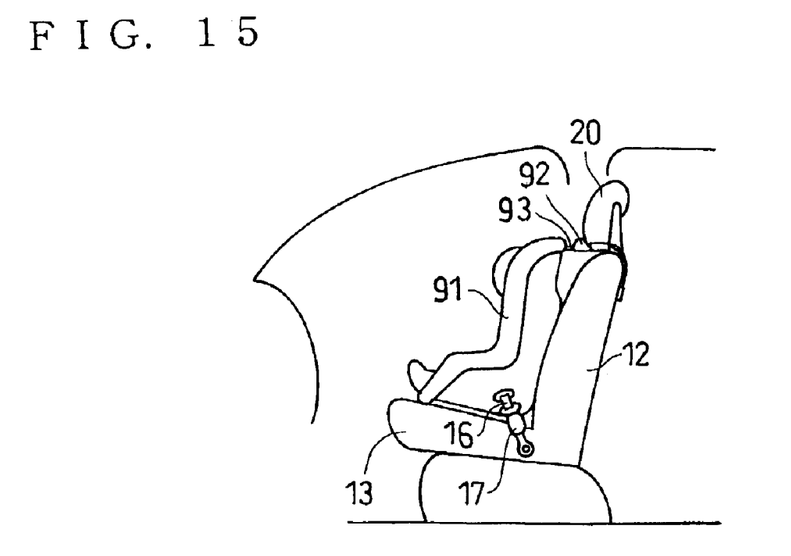
FIG. 15 is a schematic side view showing the state of a passenger compartment in a further embodiment of the present invention in which a child seat is installed on the seat.
Figure 16:
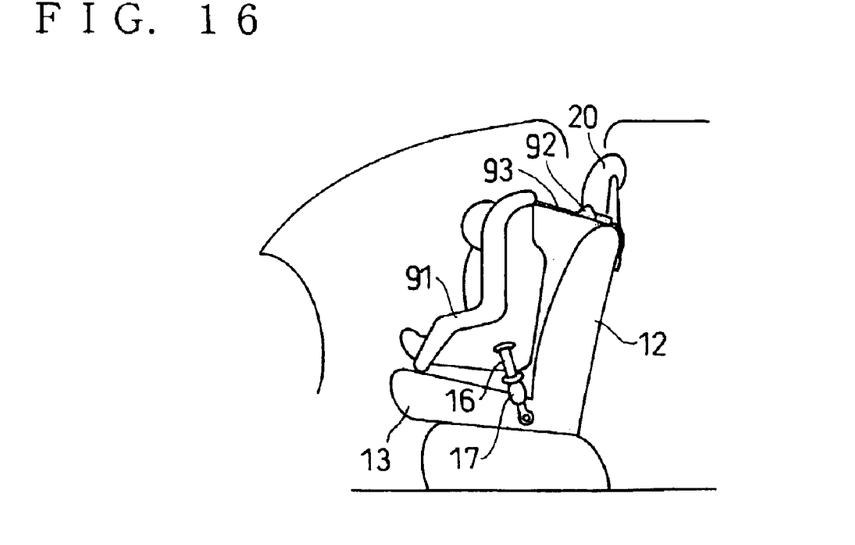
FIG. 16 is a schematic side view showing the state of the passenger compartment during a front crash.
Figure 17:
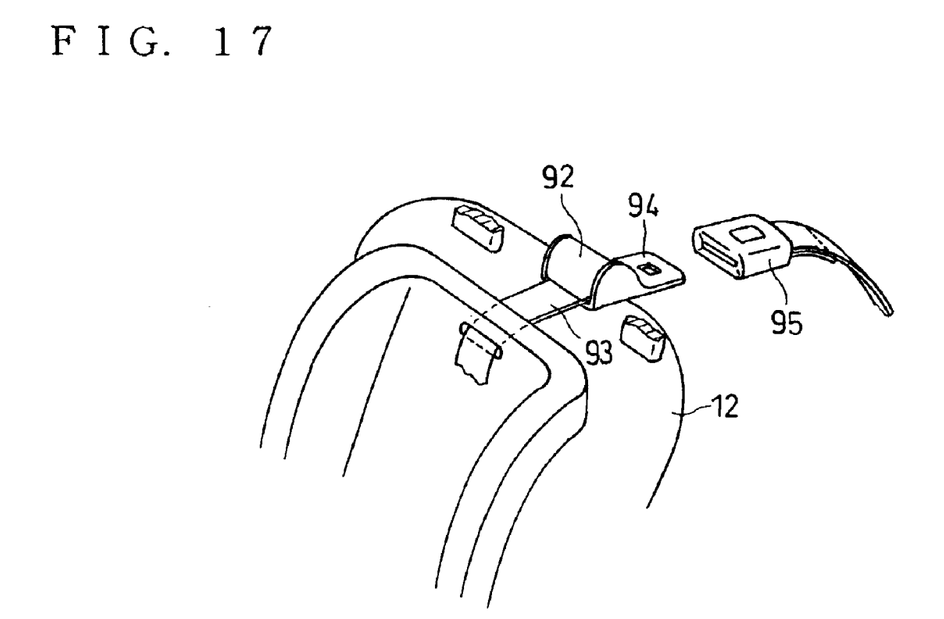
FIG. 17 is an enlarged perspective view showing the vicinity of a belt, which fastens the child seat, and a load limiter.

As shown in FIGS. 15 and 16, when installing a child seat 91 on the seat 11, a load limiter 92 may be arranged between the child seat 91 and the seat 11. As shown in FIG. 17, the distal portion of a webbing 93 is attached to the load limiter 92. The load limiter 92 is torque controlled so that an initial stroke amount with respect to an applied load is small. Thus, the load limiter 92 locks the webbing 93 when a sudden impact is produced. Then, as time elapses, the webbing 93 may gradually be drawn out of the load limiter 92. The distal end of the webbing 93 is connected to a holder (not shown) located in a lower portion of the seat 11. The load limiter 92 includes a hook 94. The hook 94 is engaged with a holder 95, which is arranged on the rear surface of the seat 11.

The lower portion of the child seat 91 is fixed to the seat 11 with the three-point belt 16. The upper portion of the child seat 91 is fixed to the seat 11 by extending the webbing 93 through the child seat 91 and fastening the hook 94 of the load limiter 92 with the holder 95. The relationship of the holder 95 and the hook 94 may be reversed.

In such structure, the child seat 91 moves integrally with the seat 11 at the moment a front crash occurs. However, the load limiter 92 is instantaneously activated and gradually releases the forward torque applied to the child seat 91. Thus, the load limiter 92 gradually absorbs the impact force. When installing the child seat 91 on the front seat, safety is further improved by employing the safety mechanism of the present invention.

In the preferred embodiment, the form and material of the webbing 25 is not limited. It is only required that the webbing 25 be flexible and have sufficient strength so that it can be drawn into and out of the retractor 55.

In the preferred embodiment, the pretensioner 58 is activated only during a front crash. However, the pretensioner 58 may also be activated during a rear crash. The air bag 18 may also be activated during a rear crash.

Figure 11:
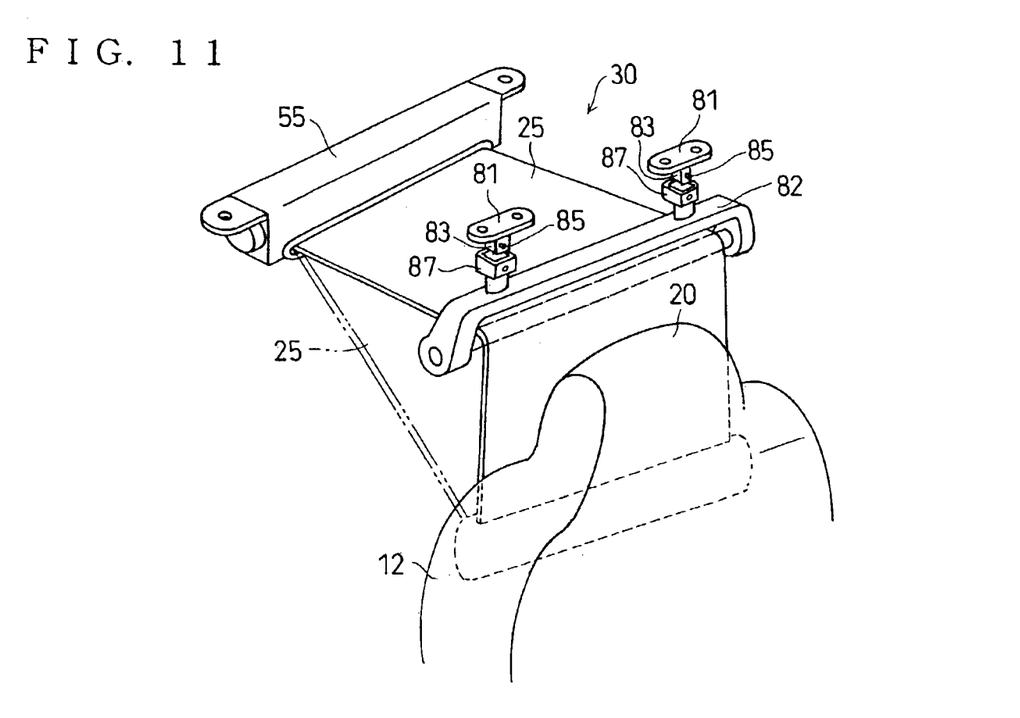
FIG. 11 is a perspective view showing a belt winding unit according to a further embodiment of the present invention.
Figure 12:
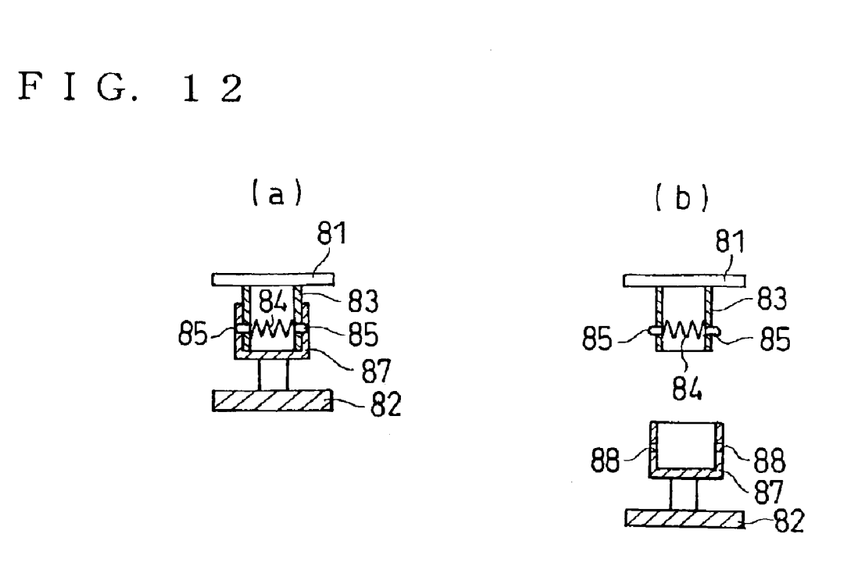
FIG. 12(a) is a cross-sectional side view showing a suspender and a guide hanger in an engaged state.
FIG. 12(b) is a cross-sectional side view showing the suspender and the guide hanger in a disengaged state.

The bypassing mechanism is not limited to the structure of the preferred embodiment. For example, as shown in FIGS. 11, 12(a), and 12(b), suspenders 81, which function as guides, may be fixed to the roof. The suspenders 81 engage a guide hanger 82. As shown in FIGS. 12(a) and 12(b), each suspender 81 has a sleeve 83. Pins 85 extend through and out of opposites sides of the sleeve 83. The pins 85 are urged outward by a spring 84. The guide hanger 82 includes boxes 87, which are arranged at positions corresponding to the suspenders 81 to receive the sleeves 83. Referring to FIG. 12(a), the sleeves 83 are normally received in the boxes 87, and the pins 87 are engaged with through holes 88, which extend through the boxes 87. However, the vibration produced by a collision disengages the pins 87 from the through holes 88 and drops the guide hanger 82. This extends the webbing 25 directly between the retractor 55 and the seat back 12.

The lock mechanism 39 is an illustrative example and other structures may be employed.

The position where the webbing 25 is secured to the seat back 12 is not limited to the position of the preferred embodiment.

The webbing 25 may be detachably secured to the seat back 12.

The rear seat air bag 18 may be eliminated.

The three-point belt 16 may be attached to a center pillar 15.

The present examples and embodiments are to be considered as illustrative and not restrictive, and the invention is not to be limited to the details given herein, but may be modified within the scope and equivalence of the appended claims.

What is claimed is:

1. An automotive seat safety mechanism including an automotive seat having a seat cushion and a seat back, which is arranged on a rear portion of the seat cushion, and a webbing arranged between the seat back and an upper portion of a vehicle, wherein a retractor urges the webbing in a winding direction to draw in the webbing while simultaneously permitting the webbing to be drawn out of the reactor in an unwinding direction when in a normal state and prevents the webbing from being drawn out when acceleration or deceleration of the vehicle becomes greater than or equal to a predetermined value, the automotive seat safety mechanism comprising:

a bypassing mechanism arranged above the seat back; and a pretensioner included in the retractor;

wherein the retractor is arranged rearward from the seat back in the upper portion of the vehicle;

wherein the webbing has an end secured to an upper position of the seat back and is extended to the retractor through a guide that is engaged with the bypassing mechanism;

wherein the guide with the webbing is disengaged from the bypassing mechanism when forward deceleration of the vehicle becomes greater than or equal to a predetermined value; and wherein the pretensioner of the retractor is activated to quickly draw in the webbing in the winding direction in response to the forward deceleration.

2. The automotive seat safety mechanism according to claim 1, wherein the retractor is arranged in a roof of the vehicle, and the webbing between the bypassing mechanism and the retractor is accommodated in the roof.

3. The automotive seat safety mechanism according to claim 2, wherein the bypassing mechanism is accommodated in the roof.

4. The automotive seat safety mechanism according to claim 1, wherein the bypassing mechanism locks the engagement with the guide with the webbing when forward acceleration of the vehicle becomes greater than or equal to a predetermined value.

5. The automotive seat safety mechanism according to claim 1, wherein the guide is arranged to support the webbing in a suspended manner.

6. The automotive seat safety mechanism according to claim 5, wherein the guide is dropped with the webbing when the guide is disengaged from the bypassing mechanism and then supported by the webbing, to which tension is applied between the upper position of the seat back and the retractor.

7. The automotive seat safety mechanism according to claim 1, wherein a rear seat passenger air bag is installed in the seat back.

8. The automotive seat safety mechanism according to claim 1, wherein the webbing between the upper position of the seat back and the bypassing mechanism is used as a screen on which a projector projects an image.

9. The automotive seat safety mechanism according to claim 1, wherein a seat belt of a front seat is secured to the automotive seat.

10. An automotive seat safety mechanism including an automotive seat having a seat cushion and a seat back, which is arranged on a rear portion of the seat cushion, and a webbing arranged between the seat back and an upper portion of a vehicle, wherein a retractor urges the webbing in a winding direction to draw in the webbing while simultaneously permitting the webbing to be drawn out of the retractor in an unwinding direction when in a normal state and prevents the webbing from being drawn out when acceleration or deceleration of the vehicle becomes greater than or equal to a predetermined value, the automotive seat safety mechanism comprising:

a bypassing mechanism arranged above the seat back; and a pretensioner included in the retractor;

wherein the retractor is arranged in an upper portion of the seat back;

wherein to webbing has an end secured to the upper portion rearward from the seat back and is extended to the retractor through a guide that is engaged with the bypassing mechanism;

wherein the guide with the webbing is disengaged from the bypassing mechanism when forward deceleration of the vehicle becomes greater than or equal to a predetermined value; and wherein the pretensioner of the retractor is activated to quickly draw into webbing in response to the forward deceleration.

11. The automotive seat safety mechanism according to claim 10, wherein the retractor is accommodated in a head rest arranged above to seat back.

12. The automotive seat safety mechanism according to claim 10, wherein the retractor is fixed to a frame of the seat back.

13. The automotive seat safety mechanism according to claim 10, wherein the bypassing mechanism is accommodated in a roof of the vehicle.

14. The automotive seat safety mechanism according to claim 10, wherein the bypassing mechanism locks the engagement with the guide with the webbing when forward acceleration of the vehicle becomes greater than or equal to a predetermined value.

15. The automotive seat safety mechanism according to claim 10, wherein the guide is arranged to support the webbing in a suspended manner.

16. The automotive seat safety mechanism according to claim 15, wherein the guide is dropped with the webbing when the guide is disengaged from the bypassing mechanism and then supported by the webbing, to which tension is applied between the upper position of the seat back and the retractor.

17. The automotive seat safety mechanism according claim 10, wherein a real seat passenger air bag is installed in the seat back.

18. The automotive seat safety mechanism according to claim 10, wherein the webbing between the upper position of the seat back and the bypassing mechanism is used as a screen on which a projector projects a image.

19. The automotive seat safety mechanism according to claim 10, wherein a seat belt of a front seat is secured to the automotive seat.

* * * * *